United States Patent
Fei et al.

(10) Patent No.: US 12,312,739 B2
(45) Date of Patent: May 27, 2025

(54) SOFTENING AGENT FOR TEXTILES, AQUEOUS SOLUTION OF SOFTENING AGENT FOR TEXTILES AND METHOD FOR PRODUCING SAME, AND TEXTILE AND METHOD FOR PRODUCING SAME

(71) Applicant: GOULSTON TECHNOLOGIES, INC., Monroe, NC (US)

(72) Inventors: Xin Fei, Monroe, NC (US); Srinivasan Ranganathan, Monroe, NC (US)

(73) Assignee: GOULSTON TECHNOLOGIES, INC., Monroe, NC (US)

( * ) Notice: Subject to any disclaimer, the term of this patent is extended or adjusted under 35 U.S.C. 154(b) by 245 days.

(21) Appl. No.: 17/533,175

(22) Filed: Nov. 23, 2021

(65) Prior Publication Data

US 2022/0333295 A1 Oct. 20, 2022

Related U.S. Application Data

(60) Provisional application No. 63/177,072, filed on Apr. 20, 2021.

(51) Int. Cl.
*D06M 15/53* (2006.01)
*C08L 71/02* (2006.01)

(52) U.S. Cl.
CPC ............ *D06M 15/53* (2013.01); *C08L 71/02* (2013.01); *C08L 2312/00* (2013.01); *D06M 2200/50* (2013.01)

(58) Field of Classification Search
CPC ... D06M 15/53; D06M 2200/50; C08L 71/02; C08L 2312/00; C09K 3/16
See application file for complete search history.

(56) References Cited

U.S. PATENT DOCUMENTS

| | | | |
|---|---|---|---|
| 5,242,607 A | 9/1993 | Yamamura et al. | |
| 5,445,652 A | 8/1995 | Connell et al. | |
| 5,985,820 A * | 11/1999 | Khan-Lodhi | C11D 3/0015 |
| | | | 510/475 |
| 7,723,459 B1 * | 5/2010 | LaVay | D06M 15/507 |
| | | | 528/295.3 |
| 2007/0197698 A1 * | 8/2007 | Nakamura | D06M 15/53 |
| | | | 524/539 |

FOREIGN PATENT DOCUMENTS

| | | |
|---|---|---|
| JP | S61186575 A | 8/1986 |
| JP | S63249779 A | 10/1988 |
| JP | H07310280 A | 11/1995 |
| JP | 2005344260 A | 12/2005 |
| JP | 2006124879 A | 5/2006 |
| WO | WO 2019000387 A1 * | 1/2019 .......... D06M 13/192 |

OTHER PUBLICATIONS

EPO machine translation of WO 2019000387 A1 to Liu et al., published Jan. 3, 2019 (Year: 2019).*
English translation of Office Action cited in Japanese Patent Application No. 2022-004386; Date of Mailing Jan. 19, 2023, 14 pages.
First Office Action in Chinese Patent Application No. 202111551877. 6, Mailing Date: Dec. 6, 2023, 9 pages.

* cited by examiner

*Primary Examiner* — Jane L Stanley
(74) *Attorney, Agent, or Firm* — CANTOR COLBURN LLP

(57) ABSTRACT

Provided is a softening agent for textiles characterized by containing a compound (A) and a crosslinking agent (B). The compound (A) is a non-silicone compound having a polyoxyalkylene chain in the molecule, and has a functional group (R1) capable of producing an ether, an ester, or a nitrogen-containing compound upon reacting with the crosslinking agent (B).

21 Claims, No Drawings

SOFTENING AGENT FOR TEXTILES, AQUEOUS SOLUTION OF SOFTENING AGENT FOR TEXTILES AND METHOD FOR PRODUCING SAME, AND TEXTILE AND METHOD FOR PRODUCING SAME

BACKGROUND

1. Field

The present invention relates to a softening agent for textiles, which exhibits washing durability; a first agent and a second agent of the softening agent for textiles; an aqueous solution of the softening agent for textiles and a method for producing the same; and a textile and a method for producing the same.

2. Description of Related Art

A variety of methods are known for improving the feel and texture of fibers of polyesters and the like. Softening agents containing a silicone component as a primary component and having washing durability, for example, were used in the past.

U.S. Pat. No. 5,445,652 discloses a method for imparting softness and feel to fibers, the method being characterized by treating the fibers with a softening agent having washing durability and containing (a) an amino-functional polymer and (b) a silicone polymer capable of reacting with a reactive group in the amino-functional polymer.

SUMMARY

However, the conventional softening agents having washing durability disclosed in U.S. Pat. No. 5,445,652 contain a silicone component as a primary component, and are therefore highly combustible and exhibit poor flame retardancy.

As a result of diligent research carried out in order to solve the problem mentioned above, the inventors of the present invention found that a softening agent for textiles that contains a specific compound (A) and a crosslinking agent (B) was right and suitable.

In order to achieve the objective described above, the main feature of a softening agent for textiles that is one aspect of the present invention is that the softening agent contains a compound (A) and a crosslinking agent (B). The compound (A) is a non-silicone compound having a polyoxyalkylene chain in the molecule, and has a functional group (R1) capable of producing an ether, an ester, or a nitrogen-containing compound upon reacting with the crosslinking agent (B).

In the softening agent for textiles, the compound (A) and the crosslinking agent (B) may be components each of which does not have a silicon atom in the molecule.

In this softening agent for textiles, the crosslinking agent (B) may have a functional group (R2) capable of reacting with the functional group (R1), the number of functional groups (R1) per molecule of the compound (A) may be two or more, the number of functional groups (R2) per molecule of the crosslinking agent (B) may be two or more, and the sum of the number of functional groups (R1) and the number of functional groups (R2) is preferably five or more.

In the softening agent for textiles, the compound (A) may have a mass average molecular weight of from 420 to 10,000,000.

In the softening agent for textiles, the compound (A) may have a mass average molecular weight of from 4,000 to 10,000.

In the softening agent for textiles, the crosslinking agent (B) may have a functional group equivalent weight of from 10 to 2,000.

In the softening agent for textiles, the crosslinking agent (B) may be a compound having a polyoxyalkylene chain in the molecule.

In the softening agent for textiles, the polyoxyalkylene chain may be a polyoxymethylene chain, a polyoxyethylene chain, a polyoxypropylene chain, a polyoxyisopropylene chain, a polyoxybutylene chain, or a polyoxyalkylene chain comprising two or more oxyalkylenes selected from among oxymethylene, oxyethylene, oxypropylene, oxyisopropylene and oxybutylene.

In the softening agent for textiles, the polyoxyalkylene chain may have a mass average molecular weight of from 400 to 9,000.

The softening agent for textiles may optionally further contain a silicone compound or a silane compound, with the total content of the silicone compound and silane compound in the softening agent for textiles being 40% by mass or less.

In the softening agent for textiles, the total content of the silicone compound and silane compound may be 1% by mass or less.

In order to achieve the objective described above, the main feature of a first agent of a softening agent for textiles that is another aspect of the present invention is that the first agent contains a compound (A) and is used together with a crosslinking agent (B). The compound (A) is a non-silicone compound having a polyoxyalkylene chain in the molecule, and has a functional group (R1) capable of producing an ether, an ester, or a nitrogen-containing compound upon reacting with the crosslinking agent (B).

In order to achieve the objective described above, the main feature of a second agent of a softening agent for textiles that is another aspect of the present invention is that the second agent contains a crosslinking agent (B) and is used together with a compound (A). The compound (A) is a non-silicone compound having a polyoxyalkylene chain in the molecule, and has a functional group (R1) capable of producing an ether, an ester or a nitrogen-containing compound upon reacting with the crosslinking agent (B).

In order to achieve the objective described above, the main feature of a method for producing an aqueous solution of a softening agent for textiles, which is another aspect of the present invention, is that the aqueous solution is prepared by adding the first agent of a softening agent for textiles and the second agent of a softening agent for textiles to water.

In order to achieve the objective described above, the main feature of an aqueous solution of a softening agent for textiles, which is another aspect of the present invention, is that the aqueous solution contains the first agent of a softening agent for textiles, the second agent of a softening agent for textiles, and water.

In order to achieve the objective described above, the main feature of a method for producing a textile, which is another aspect of the present invention, is that the aqueous solution of a softening agent for textiles is applied to a fiber.

In the method for producing a textile, the softening agent for textiles may be applied at a ratio of from 0.1% by mass to 4.0% by mass relative to the fiber.

In the method for producing a textile, the fiber to which the softening agent for textiles has been applied may be heated to a temperature of from 100° C. to 250° C.

In order to achieve the objective described above, the main feature of a textile that is another aspect of the present invention is that a polymer compound formed by a reaction between the compound (A) and the crosslinking agent (B) adheres to the textile.

The present invention succeeds in improving the washing durability of a softening agent for textiles without causing a deterioration in flame retardancy of the softening agent for textiles.

EMBODIMENT OF THE DISCLOSURE

First Embodiment

First, an explanation will be given of a first embodiment that embodies a softening agent for textiles according to the present invention (hereinafter referred to simply as "the softening agent" in some cases). The softening agent of the present embodiment contains a compound (A) described below and a crosslinking agent (B).
(Compound (A))

The compound (A) is a non-silicone compound having a polyoxyalkylene chain in the molecule, and has a functional group (R1) capable of producing an ether, an ester, or a nitrogen-containing compound upon reacting with the crosslinking agent (B). The compound (A) preferably has two or more functional groups (R1) per molecule. According to this configuration, the compound (A) can form a coating film of a polymer compound having better durability on a fiber upon reacting with the crosslinking agent (B). The compound (A) preferably has no silicon atom in the molecule from the perspective of improving flame retardancy.

The functional group (R1) is not particularly limited as long as this is a functional group capable of producing an ether, an ester, or a nitrogen-containing compound upon reacting with the crosslinking agent (B), as mentioned above. Specific examples of the functional group (R1) include an amino group, a carboxyl group, a hydroxyl group, an epoxy group, an isocyanate group, an ester group, a phosphoric acid group, a phosphoric acid ester group, a sulfur-containing acid group, and a sulfur-containing acid ester group.

Specific examples of esters include compounds having, for example, a carboxylic acid ester, a phosphoric acid ester or a thioester as an ester bond.

Specific examples of ethers include compounds having an ether bond and sulfides that are compounds having a thioether bond.

Specific examples of nitrogen-containing compounds include amide compounds, phosphoric acid amide compounds, sulfonamide compounds, imide compounds, urethane compounds, amine compounds, and urea compounds.

The main chain of the compound (A) includes a polyoxyalkylene chain. The polyoxyalkylene chain contributes to an improvement in the softness of a fiber. Examples of oxyalkylene units that constitute the polyoxyalkylene chain of the compound (A) include oxyalkylene units having from 1 to 4 carbon atoms. The polyoxyalkylene chain may be formed from one type of oxyalkylene unit or from a combination of two or more types of oxyalkylene unit. In cases where two or more types of oxyalkylene unit are used, the manner in which these units are added may be block addition, random addition, or a combination of block addition and random addition, and is not particularly limited.

Specific examples of the polyoxyalkylene chain include a polyoxymethylene chain, a polyoxyethylene chain, a polyoxypropylene chain, a polyoxyisopropylene chain, a polyoxybutylene chain, and a polyoxyalkylene chain comprising two or more units selected from among oxymethylene, oxyethylene, oxypropylene, oxyisopropylene, and oxybutylene.

The lower limit of the mass average molecular weight of the polyoxyalkylene chain is not particularly limited, but is preferably 400 or more, and more preferably 1,000 or more. The upper limit of the mass average molecular weight of the polyoxyalkylene chain is not particularly limited, but is preferably 9,000 or less, and more preferably 7,000 or less. A range obtained by arbitrarily combining the upper limit and lower limit mentioned above can be used. By using such a numerical range, it is possible to improve the softness of a fiber to which the softening agent is applied. In addition, in cases where the compound (A) is dispersed in a solution, the stability of the solution is improved. In addition, stability is further improved in cases where an emulsifier is used.

In cases where the polyoxyalkylene chain is formed through addition of an alkylene oxide, the lower limit of the number of added moles of the alkylene oxide is preferably 10 moles or more, and more preferably 25 moles or more. The upper limit of this added number of moles is not particularly limited, but is preferably 200 moles or less, and more preferably 150 moles or less. A range obtained by arbitrarily combining the upper limit and lower limit mentioned above can be used. By using such a numerical range, it is possible to improve the softness of a fiber to which the softening agent is applied. In addition, in cases where the compound (A) is dispersed in a solution, the stability of the solution is improved. In addition, stability is further improved in cases where an emulsifier is used. Moreover, the number of added moles of alkylene oxide indicates the number of moles of alkylene oxide relative to 1 mole of the compound having functional group (R1) in the charged raw materials.

Examples of the compound (A) include compounds such as those represented by formulae (1) to (3) below, each of which has a polyoxyalkylene chain as the main chain and has a plurality of functional groups (R1) or a plurality of compound having a functional group (R1) added at a terminal and/or a middle part of this polymer chain.

$$\text{R1-(oxyalkylene group)}_a\text{-R1} \tag{1}$$

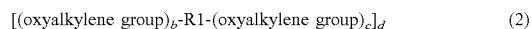

$$[\text{(oxyalkylene group)}_b\text{-R1-(oxyalkylene group)}_c]_d \tag{2}$$

$$\text{R1-[(oxyalkylene group)}_e\text{-R1-(oxyalkylene group)}_f]_g\text{-R1} \tag{3}$$

"a" to "g" in formulae (1) to (3) indicate degrees of polymerization.

In addition, examples of the compound (A) include compounds in which a polyoxyalkylene chain is added to a compound having a functional group (R1), and compounds in which a polyoxyalkylene chain is ether-bonded to a polyhydric alcohol and a compound having a functional group (R1) is added to the polyoxyalkylene chain. More specific examples of the compound (A) include a compound in which both terminals of polyoxyethylene are capped with benzene-1,2,4,5-tetracarboxylic acid, glycerol polypropoxylate triglycidyl ether, and glyceryl poly(oxypropylene)triamine It is possible to use one type of compound (A) alone or a combination of two or more types of compound (A).

The lower limit of the mass average molecular weight of the compound (A) is not particularly limited, but is preferably 420 or more, and more preferably 4,000 or more. The upper limit of the mass average molecular weight of the compound (A) is not particularly limited, but is preferably 10,000,000 or less, and more preferably 10,000 or less. A range obtained by arbitrarily combining the upper limit and lower limit mentioned above can be used. Specifying this range can effectively contribute to the softness of a fiber. Moreover, the mass average molecular weight can be measured by means of gel permeation chromatography (GPC) using polystyrene as a standard.

(Crosslinking Agent (B))

The crosslinking agent (B) is a compound capable of producing an ether, an ester, or a nitrogen-containing compound upon reacting with the compound (A) described above. The crosslinking agent (B) has a functional group (R2) capable of reacting with the functional group (R1) in the compound (A). Therefore, the crosslinking agent (B) is selected, as appropriate, from among compounds that exhibit reactivity between the functional group (R1) and the functional group (R2), depending on the type of the functional group (R1) in the compound (A). Specific examples of the functional group (R2) include an amino group, an imino group, a carboxyl group, a carboxylic acid anhydride group, a halogenated acyl group, a carbonyl group, a hydroxyl group, an epoxy group, an ester group, a thioester group, a phosphoric acid group, a phosphoric acid ester group, a phosphonate group, a thioisocyanate group, a blocked isocyanate group, and an isocyanate group.

Specific examples of combinations of the functional group (R1) in the compound (A) and the functional group (R2) in the crosslinking agent (B) include a carboxyl group and an amino group, a carboxyl group and a hydroxyl group, an anhydride of a hydroxyl group and an amino group, an anhydride of a hydroxyl group and a hydroxyl group, an amino group and an epoxy group, a carboxyl group and an epoxy group, a carboxyl group and an isocyanate group, an amino group and an isocyanate group, a carboxyl group and a blocked isocyanate group, an amino group and a blocked isocyanate group, an ester group and an amino group, a phosphoric acid group or phosphoric acid ester group and an amino group, a phosphoric acid group and an epoxy group, a sulfur-containing acid group or sulfur-containing ester group and an amino group, and a sulfur-containing acid group or sulfur-containing ester group and an epoxy group.

The crosslinking agent (B) preferably has two or more functional groups (R2) per molecule. According to this configuration, the crosslinking agent (B) can form a coating film having better durability on a fiber upon reacting with the compound (A). Furthermore, it is more preferable for the number of functional groups (R1) per molecule to be two or more, for the number of functional groups (R2) per molecule to be two or more, and for the total number of functional groups (R1) and functional groups (R2) to be five or more. According to this configuration, the crosslinking agent (B) can form a three-dimensional mesh structure and can form a coating film having better durability on a fiber upon reacting with the compound (A). The crosslinking agent (B) preferably has no silicon atom in the molecule from the perspective of improving flame retardancy.

The equivalence ratio of the functional group (R1) and the functional group (R2) in the softening agent is not particularly limited, but preferably falls within the range 1:0.1 to 20, and more preferably falls within the range 1:0.5 to 10. A range obtained by arbitrarily combining the upper limit and lower limit mentioned above can be used. By specifying this range, it is possible to form a coating film having better durability on a fiber.

The lower limit of the functional group equivalent weight of the crosslinking agent (B) is not particularly limited, but is preferably 10 or more, and more preferably 20 or more. The upper limit of the functional group equivalent weight of the crosslinking agent (B) is not particularly limited, but is preferably 2,000 or less, and more preferably 1,500 or less. A range obtained by arbitrarily combining the upper limit and lower limit mentioned above can be used. According to this configuration, the crosslinking agent (B) can form a three-dimensional mesh structure and can form a coating film having better durability on a fiber upon reacting with the compound (A).

The crosslinking agent (B) is preferably a compound having a polyoxyalkylene chain in the molecule. The polyoxyalkylene chain can be one listed in the section relating to the compound (A). This type of polyoxyalkylene chain configuration further improves the softness of a fiber to which the softening agent is applied.

Other Components

In addition to the compound (A) and the crosslinking agent (B), the softening agent of the present embodiment may optionally contain a silicone compound or a silane compound as long as a decrease in flame retardancy does not occur. In cases where a silicone compound or silane compound is contained, the total content of the silicone compound and silane compound is 40% by mass or less, and preferably 1% by mass or less, relative to the mass of the softening agent excluding solvents, such as water.

Furthermore, in order to, for example, maintain quality or improve reactivity of the softening agent, well-known additives may be blended with the softening agent as long as the advantageous effect of the present invention is not impaired. Examples of additives include water, emulsifiers, catalysts, solvents, stabilizers, and flame retardants.

(Formulation Types)

Formulation types when storing the softening agent of the present embodiment are not particularly limited. From the perspective of improving storage stability, the softening agent is preferably constituted as a multi-component type containing a first agent of the softening agent, which contains the compound (A), and a second agent of the softening agent, which contains the crosslinking agent (B). By constituting in this way, stability of blended components during storage is improved, and reactivity between the compound (A) and the crosslinking agent (B) at the time of use is improved. In cases where reactivity between the compound (A) and the crosslinking agent (B) is sufficiently low at room temperature, the softening agent may be constituted as a single component softening agent that contains the compound (A) and the crosslinking agent (B).

Second Embodiment

An explanation will now be given of a second embodiment that embodies a textile according to the present invention.

The textile of the present embodiment is a textile in which the compound (A) and crosslinking agent (B) explained in the first embodiment are applied to a fiber and a crosslinked polymer compound formed by a reaction between the compound (A) and the crosslinking agent (B) adheres to the fiber. Coating the fiber surface with the crosslinked polymer compound formed by the reaction between the compound (A) and the crosslinking agent (B) imparts softness and washing durability to the textile.

The form of the softening agent when applied to the fiber may be a dilute solution obtained by diluting the softening agent with a diluting solvent, examples of which include low viscosity mineral oil solutions, organic solvent solutions, and aqueous solutions. The softening agent is preferably prepared as an aqueous solution from the perspectives of, for example, excellent stability, reactivity between the compound (A) and the crosslinking agent (B), and handleability. The aqueous solution may be produced by means of a method that includes adding the first agent of the softening agent and the second agent of the softening agent to a prescribed volume of water, and then mixing. Alternatively, the aqueous solution may be produced by means of a method that includes separately preparing an aqueous solution of the first agent of the softening agent and an aqueous solution of a second agent of the softening agent, and then mixing these aqueous solutions at the time of use.

A fiber to which the softening agent is to be applied may be a staple fiber, a woven fabric, or a non-woven fabric. It also may be a melt-spun yarn, a drawn yarn, or a fiber bundle producing a woven fabric or non-woven fabric may be used. The fiber that constitutes the textile may be a synthetic fiber or a natural fiber. The type of fiber is not particularly limited, but examples thereof include (1) polyester fibers, such as poly(ethylene terephthalate) (PET), poly(trimethylene terephthalate), poly(butylene terephthalate), poly(ethylene naphthalate), poly(lactic acid), and composite fibers containing these polyester resins; (2) polyamide fibers, such as nylon 6 and nylon 66; (3) polyacrylic-based fibers, such as polyacrylic and modacrylic fibers; (4) polyolefin fibers, such as polyethylene and polypropylene; (5) natural fibers, such as cotton fibers, rayon fibers, and wool; and mixed yarns of these types of fiber.

A dilute solution of the softening agent, such as an aqueous solution obtained in the manner described above, is applied to a fiber using a well-known method. The method for applying the solution to the fiber is not particularly limited, and examples thereof include roller application methods, guide application methods, immersion application methods, and spray application methods.

The proportion of the softening agent applied to the fiber is not particularly limited, but the softening agent is preferably applied so that the proportion thereof is from 0.1% by mass to 4.0% by mass relative to the mass of the fiber in terms of mass of softening agent excluding diluting solvents, such as water. With this configuration, a softness-imparting effect can be effectively exhibited.

Next, the fiber to which the softening agent has been applied is preferably heat treated at a temperature of from 100° C. to 250° C. The heating time is specified, as appropriate, in view of, for example, the treatment temperature, but is preferably 1 to 20 minutes, and more preferably 5 to 10 minutes. As a result of this heat treatment, the reaction between the compound (A) and the crosslinking agent (B) is facilitated, and a coating film of a durable crosslinked polymer compound is formed on the fiber. The fiber on which the coating film has been formed may further be subjected to a post-curing treatment in a storage environment such as room temperature. Such a configuration forms a coating film of a more durable crosslinked polymer compound. The post-curing period is specified, as appropriate, in view of, for example, temperature conditions and productivity, but is preferably 1 to 30 days, and more preferably 7 to 14 days.

The operation and advantageous effects of the softening agent and textile of the embodiments described above will now be explained.

The softening agent of the embodiment described above is constituted so as to contain the crosslinking agent (B) and the compound (A), which is a non-silicone compound having a polyoxyalkylene chain in the molecule and is a compound having a functional group (R1) capable of producing an ether or the like upon reacting with the crosslinking agent (B). Since no silicone component is contained as a primary component, it is possible to obtain a textile that does not undergo a deterioration in flame retardancy. In addition, it is possible to obtain a textile having excellent softness and washing durability.

EXAMPLES

Examples will now be given below to describe the features and effects of the present invention more specifically, but the present invention is not limited to these examples. In the following working examples and comparative examples, "parts" means parts by mass and "%" means % by mass.

Experimental Part 1 (Preparation of Textile)

Using the softening agents shown in Table 4, a polyester staple of each of working examples and comparative examples was prepared by forming a coating film of a crosslinked polymer compound on the polyester staple, which corresponds to a textile.

Each of the softening agents shown in Table 4 was constituted from any of compositions (P-1) to (P-31) and composition (rP-1) and a silicone compound (rA-1), which was added as needed. Compositions (P-1) to (P-31) and composition (rP-1) contained the compound (A), the crosslinking agent (B), and, as needed, a catalyst (C), at the proportions shown in Table 3.

Methods for preparing the polyester staples of the working examples and comparative examples are shown below.

Working Example 1

First, a dispersion processing liquid A was prepared by slowly adding and dispersing a compound (A-1) shown in table 1 while stirring deionized water so as to attain a final content of 1.2 parts (%). Similarly, a dispersion processing liquid B was prepared by slowly adding and dispersing a crosslinking agent (B-1) shown in Table 2 while stirring deionized water so as to attain a final content of 1.2 parts (%). Immediately before being applied to a polyester staple, a softening agent dispersion processing liquid was prepared by mixing 82.3 parts of the dispersion processing liquid A of the compound (A-1) and 17.7 parts of the dispersion processing liquid B of the crosslinking agent (B-1) at the ratio shown for composition (P-1) in Table 3. A polyester staple (15 denier×64 mm) was immersed in this softening agent dispersion processing liquid. At this point, excess softening agent dispersion processing liquid was removed by squeezing so that 10 parts of the softening agent dispersion processing liquid was adhered to 10 parts of the polyester staple. Moreover, preparation was carried out so that the concentration of (pure) softening agent in the softening agent dispersion processing liquid (1.2%) was the same as the coating weight applied to the polyester staple (1.2% owf).

Next, the polyester staple was allowed to dry naturally so as to obtain a fiber sample to be thermally cured. The fiber sample was then thermally cured by being left for 10 minutes in a hot air current oven adjusted to a temperature of 130° C. A polyester staple of Working Example 1 was obtained in such a way that a coating film of a crosslinked polymer compound was formed on the fiber.

Working Examples 2 to 17 and 19 to 21

Compositions (P-2) to (P-16) and (P-20) shown in Tables 3 and 4 were used. The concentration of (pure) softening agent in the softening agent dispersion processing liquid and the coating weight of the softening agent on the polyester staple were changed to the values shown in Table 4. Other than these changes, polyester staples were prepared using a method similar to that used in Working Example 1.

Working Example 18

Composition (P-19) shown in Tables 3 and 4 was used. In addition, the coating weight of the softening agent on the polyester staple was changed to the coating weight shown in Table 4.

A dispersion processing liquid A was prepared by slowly adding and dispersing a compound (A-3) shown in table 1 while stirring deionized water so as to attain a final content of 0.7 parts (%). Similarly, a dispersion processing liquid B was prepared by slowly adding and dispersing the crosslinking agent (B-1) shown in Table 2 while stirring deionized water so as to attain a final content of 0.7 parts (%). Furthermore, a dispersion processing liquid C was prepared by slowly adding and dispersing a catalyst (C-1) shown in Table 3 while stirring deionized water so as to attain a final content of 0.7 parts (%). Immediately before being applied to a polyester staple, a softening agent dispersion processing liquid was prepared by mixing 70 parts of the dispersion processing liquid A of the compound (A-3), 28 parts of the dispersion processing liquid B of the crosslinking agent (B-1), and 2 parts of the dispersion processing liquid C of the catalyst (C-1) at the ratio shown for composition (P-19) in Table 3. The concentration of (pure) softening agent in the obtained softening agent dispersion processing liquid was 0.7%. Other than these changes, polyester staples were prepared using a method similar to that used in Working Example 1.

Working Example 22

Composition (P-23) and silicone compound (rA-1) shown in Tables 3 and 4 were used. In addition, the coating weight of the softening agent on the polyester staple was changed to the coating weight shown in Table 4.

First, a softening agent dispersion processing liquid was prepared by slowly adding and dispersing 0.0929 parts (%) of compound (A-3), 0.0066 parts (%) of a crosslinking agent (B-7), and 0.00125 parts (%) of a solution containing 40% of the silicone compound (rA-1) in deionized water at 25° C. The concentration of (pure) softening agent in the obtained softening agent dispersion processing liquid was 0.1%. Other than these changes, polyester staples were prepared using a method similar to that used in Working Example 1.

Working Examples 23 to 30

Compositions (P-23) and (P-29) to (P-31) shown in Tables 3 and 4 were used. In addition, the concentration of (pure) softening agent in the softening agent dispersion processing liquid and the coating weight of the softening agent on the polyester staple were changed to the values shown in Table 4. Other than these changes, polyester staples were prepared using a method similar to that used in Working Example 22.

Comparative Example 1

Composition (rP-1) shown in Tables 3 and 4 was used. In addition, the coating weight of the softening agent on the polyester staple was changed to the coating weight shown in Table 4. That is, a softening agent dispersion processing liquid was prepared by slowly adding and dispersing 0.95 parts (%) of a solution containing 40% of the silicone compound (rA-1) and 0.02 parts (%) of a crosslinking agent (rB-1) in deionized water at 25° C. The concentration of (pure) softening agent in the obtained softening agent dispersion processing liquid was 0.4%. Other than these changes, polyester staples were prepared using a method similar to that used in Working Example 22.

With regard to the compound (A) used in the preparation of the polyester staples of the examples, the type and mass average molecular weight of the polyoxyalkylene chain in the compound (A), the type of functional group (R1) and number thereof in the compound (A), and the mass average molecular weight of the compound (A) are shown in the "Polyoxyalkylene chain" column, "Functional group (R1)" column, and "Mass average molecular weight" column, respectively, in Table 1.

With regard to the crosslinking agent (B) used in the preparation of the polyester staples of the examples, the type of functional group (R2) and number thereof in the crosslinking agent (B), the type and mass average molecular weight of the polyoxyalkylene chain in the crosslinking agent (B), the functional group equivalent weight, and the mass average molecular weight of the crosslinking agent (B) are shown in the "Functional group (R2)" column, "Polyoxyalkylene chain" column, "Functional group equivalent weight" column, and "Mass average molecular weight" column, respectively, in Table 2.

With regard to the composition (P) used in the preparation of the polyester staples of the examples, the type of the compound (A) and the proportion thereof in the composition (P), the type of the crosslinking agent (B) and the proportion thereof in the composition (P), the equivalence ratio of the functional group (R1) and the functional group (R2) in the composition (P), and the type of the catalyst (C) and the proportion thereof in the composition (P) are shown in the "Compound (A)" column, the "Crosslinking agent (B)" column, the "Functional group" column, and the "Catalyst (C)" column, respectively, in Table 3.

With regard to the softening agent used in the preparation of the polyester staples of the examples, the type of the composition (P) and the proportion thereof in the softening agent, the type of the silicone compound and the proportion thereof in the softening agent, the coating weight (% owf) of the softening agent (pure component excluding water used as a solvent), and the concentration (%) of the softening agent (pure component excluding water used as a solvent) in the softening agent dispersion processing liquid are shown in the "Composition (P)" column, the "Silicone compound" column, the "Softening agent coating weight" column, and the "softening agent concentration" column, respectively, in Table 4. Moreover, the proportions of the composition (P) and the silicone compound in the softening agent are shown as quantities of pure component excluding water.

TABLE 1

| Type of compound (A) | Polyoxyalkylene chain Type | Polyoxyalkylene chain Mass average molecular weight | Functional group (R1) Type | Functional group (R1) Number | Mass average molecular weight |
|---|---|---|---|---|---|
| A-1 | Polyoxyethylene chain | 4,500 | Carboxyl group | 6 | 5,000 |
| A-2 | Polyoxypropylene chain | 1,800 | Epoxy group | 3 | 2,000 |
| A-3 | Polyoxypropylene chain | 4,950 | Amino group | 3 | 5,000 |
| rA-1 | None | — | — | — | — |

TABLE 2

| Type of crosslinking agent (B) | Functional group (R2) Type | Functional group (R2) Number | Polyoxyalkylene chain Type | Polyoxyalkylene chain Mass average molecular weight | Functional group equivalent weight | Mass average molecular weight |
|---|---|---|---|---|---|---|
| B-1 | Epoxy group | 3 | Oxypropylene | 1,800 | 667 | 2,000 |
| B-2 | Imino group | >10,000 | None | — | 44 | 750,000 |
| B-3 | Imino group | >100 | None | — | 44 | 10,000 |
| B-4 | Imino group | >1,000 | None | — | 44 | 70,000 |
| B-5 | Amino group | >100 | None | — | 59 | 15,000 |
| B-6 | Epoxy group | <=4 | None | — | Up to 175 | Up to 700 |
| B-7 | Phosphonate group | 2 to 3 | None | — | 115 to 170 | Up to 345 |
| B-8 | Isocyanate group | 3 | None | — | Up to 1,000 | Up to 3,000 |
| rB-1 | — | — | None | — | — | — |

TABLE 3

| Type of composition (P) | Compound (A) Type | Compound (A) Parts by mass | Crosslinking agent (B) Type | Crosslinking agent (B) Parts by mass | Functional group R1/R2 Equivalence ratio | Catalyst (C) Type | Catalyst (C) Parts by mass |
|---|---|---|---|---|---|---|---|
| P-1 | A-1 | 82.3 | B-1 | 17.7 | 1:1 | | |
| P-2 | A-1 | 83 | B-2 | 17 | 1:4 | | |
| P-3 | A-1 | 70.9 | B-2 | 29.1 | 1:8 | | |
| P-4 | A-2 | 74.6 | B-5 | 25.4 | 1:4 | | |
| P-5 | A-2 | 59.5 | B-5 | 40.5 | 1:8 | | |
| P-6 | A-2 | 79.8 | B-3 | 20.2 | 1:4 | | |
| P-7 | A-2 | 66.4 | B-3 | 33.6 | 1:8 | | |
| P-8 | A-2 | 79.8 | B-4 | 20.2 | 1:4 | | |
| P-9 | A-2 | 66.4 | B-4 | 33.6 | 1:8 | | |
| P-10 | A-2 | 79.8 | B-2 | 20.2 | 1:4 | | |
| P-11 | A-2 | 66.4 | B-2 | 33.6 | 1:8 | | |
| P-12 | A-2 | 79.8 | B-2 | 20.2 | 1:4 | | |
| P-13 | A-2 | 84.2 | B-2 | 15.8 | 1:3 | | |
| P-14 | A-2 | 88.9 | B-2 | 11.1 | 1:2 | | |
| P-15 | A-2 | 91.4 | B-2 | 8.6 | 1:1.5 | | |
| P-16 | A-2 | 79.8 | B-2 | 20.2 | 1:4 | | |
| P-19 | A-3 | 70 | B-1 | 28 | 1:1 | C-1 | 2 |
| P-20 | A-3 | 89.6 | B-6 | 10.4 | 1:1 | | |
| P-23 | A-3 | 93.4 | B-7 | 6.6 | 1:1 | | |
| P-29 | A-3 | 85.1 | B-8 | 14.9 | 1:1 | | |
| P-30 | A-3 | 79.3 | B-8 | 20.7 | 1:1.5 | | |
| P-31 | A-3 | 74.3 | B-8 | 25.7 | 1:2 | | |
| rP-1 | rA-1 | 95 | rB-1 | 5 | — | | |

TABLE 4

| Run | (Pure) softening agent for textiles Composition (P) Type | (Pure) softening agent for textiles Composition (P) Parts by mass | (Pure) softening agent for textiles Silicone compound Type | (Pure) softening agent for textiles Silicone compound Parts by mass | Softening agent coating weight % owf | Softening agent concentration % | Post-curing (Y/N) |
|---|---|---|---|---|---|---|---|
| Working Example 1 | P-1 | 100 | — | — | 1.2 | 1.2 | N |
| Working Example 2 | P-2 | 100 | — | — | 1.2 | 1.2 | N |
| Working Example 3 | P-3 | 100 | — | — | 1.4 | 1.4 | N |
| Working Example 4 | P-4 | 100 | — | — | 1.35 | 1.35 | N |
| Working Example 5 | P-5 | 100 | — | — | 1.7 | 1.7 | N |
| Working Example 6 | P-6 | 100 | — | — | 1.25 | 1.25 | Y |
| Working Example 7 | P-7 | 100 | — | — | 1.5 | 1.5 | Y |
| Working Example 8 | P-8 | 100 | — | — | 1.25 | 1.25 | Y |
| Working Example 9 | P-9 | 100 | — | — | 1.5 | 1.5 | Y |
| Working Example 10 | P-10 | 100 | — | — | 1.25 | 1.25 | Y |
| Working Example 11 | P-11 | 100 | — | — | 1.5 | 1.5 | Y |
| Working Example 12 | P-12 | 100 | — | — | 0.5 | 0.5 | Y |
| Working Example 13 | P-13 | 100 | — | — | 0.5 | 0.5 | Y |
| Working Example 14 | P-14 | 100 | — | — | 0.5 | 0.5 | Y |
| Working Example 15 | P-15 | 100 | — | — | 0.5 | 0.5 | Y |
| Working Example 16 | P-16 | 100 | — | — | 1.25 | 1.25 | Y |
| Working Example 17 | P-16 | 100 | — | — | 1.25 | 1.25 | Y |
| Working Example 18 | P-19 | 100 | — | — | 0.7 | 0.7 | Y |
| Working Example 19 | P-20 | 100 | — | — | 0.4 | 0.4 | Y |
| Working Example 20 | P-20 | 100 | — | — | 0.4 | 0.4 | Y |
| Working Example 21 | P-20 | 100 | — | — | 0.4 | 0.4 | Y |
| Working Example 22 | P-23 | 99.5 | rA-1 | 0.5 | 0.1 | 0.1 | N |
| Working Example 23 | P-23 | 100 | — | — | 0.2 | 0.2 | N |
| Working Example 24 | P-23 | 100 | — | — | 0.3 | 0.3 | N |
| Working Example 25 | P-23 | 100 | — | — | 0.4 | 0.4 | N |
| Working Example 26 | P-23 | 100 | — | — | 0.5 | 0.5 | N |
| Working Example 27 | P-23 | 100 | — | — | 0.6 | 0.6 | N |
| Working Example 28 | P-29 | 100 | — | — | 0.4 | 0.4 | N |
| Working Example 29 | P-30 | 100 | — | — | 0.4 | 0.4 | N |
| Working Example 30 | P-31 | 100 | — | — | 0.4 | 0.4 | N |
| Comparative Example 1 | — | — | rP-1 | 100 | 0.4 | 0.4 | N |

| Run | Pre-washing softness Feel | Pre-washing softness SPF Coefficient | Softness after washing 5 times Feel | Softness after washing 5 times SPF Coefficient | Washing temperature ° C. | Flame resistance test BS5852 |
|---|---|---|---|---|---|---|
| Working Example 1 | 4 | 0.334 | 4 | 0.356 | 40 | Pass |
| Working Example 2 | 4 | 0.314 | 4 | 0.358 | 40 | Pass |
| Working Example 3 | 4 | 0.309 | 3 | 0.368 | 40 | Pass |
| Working Example 4 | 4 | 0.335 | 4 | 0.351 | 40 | Pass |
| Working Example 5 | 4 | 0.346 | 4 | 0.326 | 40 | Pass |
| Working Example 6 | 5 | 0.277 | 5 | 0.291 | 40 | Pass |
| Working Example 7 | 5 | 0.273 | 5 | 0.285 | 40 | Pass |
| Working Example 8 | 5 | 0.299 | 4 | 0.312 | 40 | Pass |
| Working Example 9 | 5 | 0.268 | 5 | 0.286 | 40 | Pass |
| Working Example 10 | 5 | 0.272 | 5 | 0.276 | 40 | Pass |
| Working Example 11 | 5 | 0.278 | 5 | 0.276 | 40 | Pass |
| Working Example 12 | 5 | 0.283 | 5 | 0.285 | 40 | Pass |
| Working Example 13 | 5 | 0.304 | 4 | 0.335 | 40 | Pass |
| Working Example 14 | 4 | 0.316 | 4 | 0.353 | 40 | Pass |
| Working Example 15 | 5 | 0.293 | 3 | 0.363 | 40 | Pass |
| Working Example 16 | 5 | 0.286 | 5 | 0.300 | 60 | Pass |
| Working Example 17 | 5 | 0.286 | 5 | 0.293 | 90 | Pass |
| Working Example 18 | 5 | 0.250 | 5 | 0.300 | 40 | Pass |
| Working Example 19 | 5 | 0.262 | 5 | 0.290 | 40 | Pass |
| Working Example 20 | 5 | 0.262 | 5 | 0.299 | 60 | Pass |
| Working Example 21 | 5 | 0.262 | 5 | 0.284 | 90 | Pass |
| Working Example 22 | 5 | 0.282 | 3 | 0.364 | 40 | Pass |
| Working Example 23 | 5 | 0.230 | 5 | 0.260 | 40 | Pass |
| Working Example 24 | 5 | 0.229 | 5 | 0.293 | 40 | Pass |
| Working Example 25 | 5 | 0.219 | 5 | 0.285 | 40 | Pass |
| Working Example 26 | 5 | 0.219 | 5 | 0.269 | 40 | Pass |
| Working Example 27 | 5 | 0.236 | 5 | 0.268 | 40 | Pass |
| Working Example 28 | 5 | 0.226 | 4 | 0.308 | 40 | Pass |
| Working Example 29 | 5 | 0.234 | 4 | 0.307 | 40 | Pass |
| Working Example 30 | 5 | 0.218 | 5 | 0.274 | 40 | Pass |
| Comparative Example 1 | 5 | 0.261 | 2 | 0.414 | 40 | Fail |

Details relating to the compound (A), the crosslinking agent (B), the catalyst (C), and other components shown in Tables 1 to 4 are as follows.

(Compound (A))
- A-1: Compound formed by capping both terminals of polyoxyethylene with benzene-1,2,4,5-tetracarboxylic acid
- A-2: Glycerol polypropoxylate triglycidyl ether
- A-3: Glyceryl poly(oxypropylene)triamine (Crosslinking Agent (B))
- B-1: Polyglycerol polyglycidyl ether; number of polyglycerol repeating units: 3
- B-2: Branched polyethyleneimine (repeating unit: —(CH$_2$—CH$_2$—NH)$_n$— (10<n<10$^5$))
- B-3: Branched polyethyleneimine
- B-4: Branched polyethyleneimine
- B-5: Poly(allyl amine)
- B-6: Sorbitol polyglycidyl ether
- B-7: (5-ethyl-2-methyl-1,3,2-dioxaphosphorinan-5-yl) methyl dimethylphosphonate P-oxide and bis[(5-ethyl-2-methyl-1,3,2-dioxaphosphorinan-5-yl)methyl] methyl phosphonate P,P'-dioxide (at a mass ratio of 2:1)
- B-8: Blocked polyisocyanate (NCO content=12.5% by mass)
- rB-1: Silane crosslinking agent (product name Lurol PS-662, produced by Goulston Technologies, Inc.)

(Catalyst (C))
- C-1: 2-piperazin-1-yl-ethylamine (Other Components)
- rA-1: Silicone compound (product name Lurol PS-12186, produced by Goulston Technologies, Inc.)

Experimental Part 2 (Post-Curing Treatment)

A polyester staple obtained by carrying out application and thermal curing on a production line was left to rest for a further 2 weeks at room temperature.

In the "Post-curing" column in Table 4, "Y" indicates that post-curing was carried out and "N" indicates that post-curing was not carried out.

Experimental Part 3 (Pre-Washing Softness)

Pre-washing softness (feel) and pre-washing softness (SPF) were evaluated using polyester staple samples obtained in the examples.

Pre-Washing Softness (Feel)

3 evaluators assessed whether or not feel was excellent to evaluate the surface condition of the polyester staple by hand touch using the following criteria. A case where feel was particularly excellent was given 5 points, a case where feel was excellent was given 4 points, a case where feel was good was given 3 points, a case where feel was rather poor was given 2 points, and a case where feel was poor was given 1 point.

Average values were calculated from the points given by the evaluators. An average score of 4.6 points or more was evaluated as "Excellent: 5", an average score of 3.6 points or more but less than 4.6 points was evaluated as "Good: 4", an average score of 2.6 points or more but less than 3.6 points was evaluated as "Passable: 3", an average score of 1.6 points or more but less than 2.6 points was evaluated as "Somewhat poor: 2", and an average score of less than 1.6 points was evaluated as "Poor: 1". The results are shown in the "Feel" column for pre-washing softness in Table 4.

Pre-Washing Softness (SPF)

Softness of a polyester staple was evaluated by performing a staple pad friction test using an instron tester. This test was carried out in accordance with B. S. Gupta, Friction in Textile Materials, Chapter 5, page 216 to 217, published by Woodhead Publishing Limited, Year 2008.

First, an obtained polyester staple sample is subjected to fiber opening, formed into a pad, and placed on a sample stand. A load-bearing sled is placed on the sample, and the coefficient of friction (or staple pad friction, SPF) is measured by measuring friction generated by dragging the sled. Moreover, a high SPF value indicates poor feel, and a low SPF value indicates that the staple is soft. Measured values are shown in the "SPF" column for pre-washing softness in Table 4.

Experimental Part 4 (Post-Washing Softness)

After evaluating softness in the experimental part 3, washing was carried out in the manner described below, and post-washing softness was then evaluated.

The washing method was carried out in accordance with AATCC-61 standard. Polyester staple samples to which softening agent had been applied were washed using a rapid washing method using a Launder-0 meter at a washing temperature shown in the "Washing temperature" column in Table 4 (40° C., 60° C., or 90° C.). The ratio of the mass of the sample relative to the volume of washing water was 100:1.

The washing time of 45 minutes was divided into five cycles of 9 minutes each, and a washing liquid obtained by adding 0.15% by mass of an AATCC 1993 Standard Reference Detergent to deionized water was used in the first cycle.

Following the first cycle, the sample was removed from the cylinder and wrung out in order to remove as much liquid as possible. The second cycle was carried out in the same way as the first cycle. The remaining three cycles were carried out in the same way, but using only deionized water. Following the washing, the sample was air-dried.

The obtained washed samples were evaluated in terms of feel and measured in terms of SPF using similar methods to those used for pre-washing softness (feel) and pre-washing softness (SPF). The results are shown in the "Feel" column and "SPF" column for softness after washing five times in Table 4.

Experimental Part 5 (Flame Retardancy)

A flame retardancy test was carried out in accordance with BS-5852 standard. Polyester staple samples were burned for 40 seconds using an ignition source at a gas flow rate of 160 mL/min in an environment having a temperature of 25° C. The ignition source was then removed and the period of time over which the sample continued to burn was measured. Flame retardancy was evaluated using the criteria shown below.

Flame Retardancy Evaluation Criteria

Pass: the period of time over which the sample continued to burn was less than 120 seconds Fail: the period of time over which the sample continued to burn was 120 seconds or longer

OTHERS

In Working Example 1 above, the compound (A) and the crosslinking agent (B) were first prepared separately as aqueous solutions, and a softening agent dispersion processing liquid was prepared immediately before use by mixing these aqueous solutions.

Meanwhile, it was confirmed that in a case where a softening agent dispersion processing liquid is prepared by introducing the compound (A) and the crosslinking agent (B) simultaneously into the same container, similar evaluations to those of Working Example 1 were obtained when the softening agent dispersion processing liquid was immediately applied to a fiber.

As is clear from the evaluation results for working examples relative to comparative examples in Table 4, a softening agent having excellent flame retardancy can be obtained according to the present invention. In addition, a coating agent having excellent washing durability and softness is formed.

What is claimed is:

1. A softening agent for textiles, characterized by containing a compound (A) and a crosslinking agent (B), wherein the compound (A) is a non-silicone compound having a polyoxyalkylene chain in the molecule and having two or more functional groups (R1) each capable of producing an ether, an ester, or a nitrogen-containing compound upon reacting with the crosslinking agent (B), each of the functional groups (R1) being an amino group, a carboxyl group, an epoxy group, an isocyanate group, a phosphoric acid group, a phosphoric acid ester group, a sulfur-containing acid group, or a sulfur-containing acid ester group.

2. The softening agent for textiles according to claim 1, wherein each of the compound (A) and the crosslinking agent (B) does not have a silicon atom in the molecule.

3. The softening agent for textiles according to claim 1, wherein
   the crosslinking agent (B) has a functional group (R2) capable of reacting with the functional group (R1),
   the number of functional groups (R2) per molecule of the crosslinking agent (B) is two or more, and
   the sum of the number of functional groups (R1) and the number of functional groups (R2) is five or more.

4. The softening agent for textiles according to claim 1, wherein the compound (A) has a mass average molecular weight of from 420 to 10,000,000.

5. The softening agent for textiles according to claim 1, wherein the compound (A) has a mass average molecular weight of from 4,000 to 10,000.

6. The softening agent for textiles according to claim 1, wherein the crosslinking agent (B) has a functional group equivalent weight of from 10 to 2,000.

7. The softening agent for textiles according to claim 1, wherein the crosslinking agent (B) is a compound having a polyoxyalkylene chain in the molecule.

8. The softening agent for textiles according to claim 7, wherein the polyoxyalkylene chain of the crosslinking agent (B) is a polyoxymethylene chain, a polyoxyethylene chain, a polyoxypropylene chain, a polyoxyisopropylene chain, a polyoxybutylene chain, or a polyoxyalkylene chain comprising two or more oxyalkylenes selected from among oxymethylene, oxyethylene, oxypropylene, oxyisopropylene, and oxybutylene.

9. The softening agent for textiles according to claim 7, wherein the polyoxyalkylene chain of the crosslinking agent (B) has a mass average molecular weight of from 400 to 9,000.

10. The softening agent for textiles according to claim 1, wherein the polyoxyalkylene chain is a polyoxymethylene chain, a polyoxyethylene chain, a polyoxypropylene chain, a polyoxyisopropylene chain, a polyoxybutylene chain, or a polyoxyalkylene chain comprising two or more oxyalkylenes selected from among oxymethylene, oxyethylene, oxypropylene, oxyisopropylene, and oxybutylene.

11. The softening agent for textiles according to claim 1, wherein the polyoxyalkylene chain has a mass average molecular weight of from 400 to 9,000.

12. The softening agent for textiles according to claim 1, optionally further containing a silicone compound or a silane compound, with the total content of the silicone compound and silane compound in the softening agent for textiles being 40% by mass or less.

13. The softening agent for textiles according to claim 12, wherein the total content of the silicone compound and silane compound is 1% by mass or less.

14. A textile characterized by having adhered thereto a polymer compound formed by a reaction between the compound (A) and crosslinking agent (B) in the softening agent for textiles according to claim 1.

15. The softening agent for textiles according to claim 1, wherein the crosslinking agent (B) has a functional group (R2) capable of reacting with the functional group (R1), and the functional group (R2) is an amino group, an imino group, a carboxyl group, a carboxylic acid anhydride group, a halogenated acyl group, a carbonyl group, a hydroxyl group, an epoxy group, an ester group, a thioester group, a phosphoric acid group, a phosphoric acid ester group, a phosphonate group, a thioisocyanate group, a blocked isocyanate group, or an isocyanate group.

16. The softening agent for textiles according to claim 1, wherein the nitrogen-containing compound is an amide compound, an imide compound, a urethane compound, or a urea compound.

17. A method for producing an aqueous solution of a softening agent for textiles, the method being characterized by adding first and second components of a softening agent for textiles to water, wherein
   the first component of a softening agent for textiles contains a compound (A),
   the second component of a softening agent for textiles contains a crosslinking agent (B), and
   the compound (A) is a non-silicone compound having a polyoxyalkylene chain in the molecule, and has two or more functional groups (R1) each capable of producing an ether, an ester, or a nitrogen-containing compound upon reacting with the crosslinking agent (B), each of the functional groups (R1) being an amino group, a carboxyl group, an epoxy group, an isocyanate group, a phosphoric acid group, a phosphoric acid ester group, a sulfur-containing acid group, or a sulfur-containing acid ester group.

18. An aqueous solution of a softening agent for textiles, characterized by containing first and second components of a softening agent for textiles and water, wherein
   the first component of a softening agent for textiles contains a compound (A),
   the second component of a softening agent for textiles contains a crosslinking agent (B), and
   the compound (A) is a non-silicone compound having a polyoxyalkylene chain in the molecule, and has two or more functional groups (R1) capable of producing an ether, an ester, or a nitrogen-containing compound upon reacting with the crosslinking agent (B), each of the functional groups (R1) being an amino group, a carboxyl group, an epoxy group, an isocyanate group, a phosphoric acid group, a phosphoric acid ester group, a sulfur-containing acid group, or a sulfur-containing acid ester group.

19. A method for producing a textile, the method being characterized by applying the aqueous solution of a softening agent for textiles according to claim 18 to a fiber.

20. The method for producing a textile according to claim 19, wherein the softening agent for textiles is applied at a ratio of from 0.1% by mass to 4.0% by mass relative to the fiber.

21. The method for producing a textile according to claim 19, wherein the fiber to which the softening agent for textiles has been applied is heated to a temperature of from 100° C. to 250° C.

* * * * *